(12) United States Patent
Faulkner et al.

(10) Patent No.: US 6,562,164 B1
(45) Date of Patent: May 13, 2003

(54) SYSTEM FOR TERMINATING OPTICAL CABLES

(75) Inventors: Lynn LeRoy Faulkner, Westerville, OH (US); Dale Ensminger, Columbus, OH (US); Douglas Behrens Pape, Upper Arlington, OH (US); Malcolm Campbell Mogren, Grove City, OH (US); Brad Aaron Thomas, Galloway, OH (US); Matthew Paul Rubal, Powell, OH (US); Thomas Richard Agans, Hilliard, OH (US); Lee Fredette, Bexley, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 09/439,018

(22) Filed: Nov. 12, 1999

Related U.S. Application Data

(60) Provisional application No. 60/108,402, filed on Nov. 13, 1998.

(51) Int. Cl.[7] ............................................... B32B 31/16
(52) U.S. Cl. ..................... 156/64; 156/73.2; 156/73.6
(58) Field of Search ................... 156/64, 73.1, 73.2, 156/73.4, 73.5, 73.6, 157, 158, 304.1, 304.3

(56) References Cited

U.S. PATENT DOCUMENTS

| | | | |
|---|---|---|---|
| 4,176,909 A | 12/1979 | Prunier | |
| 4,240,849 A | * 12/1980 | Kurokawa et al. | 156/73.2 |
| 4,264,128 A | 4/1981 | Young | |
| 4,265,689 A | 5/1981 | Jeffrey | |
| 4,316,734 A | 2/1982 | Spinosa et al. | |
| 4,339,247 A | 7/1982 | Faulkner et al. | |
| 4,351,586 A | 9/1982 | Phillips et al. | |
| 4,381,208 A | * 4/1983 | Baverstock | 156/52 |
| 4,512,630 A | 4/1985 | Runge | |
| 4,548,771 A | 10/1985 | Senapati et al. | |
| 4,673,245 A | 6/1987 | Kling et al. | |
| 4,721,357 A | 1/1988 | Kovalchick et al. | |
| 4,738,055 A | 4/1988 | Jackson et al. | |
| 4,805,980 A | 2/1989 | MacKenroth | |
| 4,876,817 A | 10/1989 | Hill | |
| 5,208,977 A | 5/1993 | Ricard | |
| 5,300,162 A | 4/1994 | Brockmeyer et al. | |
| 5,690,766 A | 11/1997 | Zwick | |
| 6,027,589 A | * 2/2000 | Kato et al. | 156/73.2 |

FOREIGN PATENT DOCUMENTS

| | | |
|---|---|---|
| EP | 0 048 561 | 3/1982 |
| EP | 0 386 769 | 9/1990 |
| EP | 0 745 874 A2 | 12/1996 |
| FR | 2 310 579 | 3/1976 |
| JP | 63 231409 | 9/1988 |
| JP | 4 300254 | 10/1992 |
| JP | 5 221696 | 8/1993 |

OTHER PUBLICATIONS

Author Unknown; AMP OPTIMATE™ FSMA Fiber Optic Connector, Types 905 & 906; May 24, 1996 Rev. A; pp. 1–8; AMP Inc., Harrisburg, PA 17105.

(List continued on next page.)

*Primary Examiner*—James Sells
(74) *Attorney, Agent, or Firm*—William B. Richards; Courtney J. Miller (57) ABSTRACT

An integrated, automated system for terminating an optical fiber with an optical connector which includes a process for preparing adhesive for injection into an optical connector, an apparatus and process for injecting adhesive into an optical connector, an apparatus for inserting a fiber optic cable into an optical connector, and a process for curing an adhesive following insertion of optical fiber into the optical connector. Devices and methods that utilize vibratory or wave energy throughout the assembly process are also provided, as are feedback modules that enhance the accuracy and efficiency of the system.

48 Claims, 8 Drawing Sheets

OTHER PUBLICATIONS

Geoffrey Boothroyd et al.; Auto Assembly, Book, 1982, Marcel Dekker, Inc., New York, New York, p.p. 12–19; 101–107; 256–261.

Ultrasonic Insertion and Staking; http://www.tomantool.com/stake.html.

Wire, tube and profile drawing; MP/Interconsulting; http://www.mpi.powerultrasonics.com/metal–drawing.html.

Design and optimisation of an ultrasonic die system for forming metal cans; http://www.powerultrasonics.com/cgi–bin/ultrasonic.pl?page=chapterone8.

* cited by examiner

SYSTEM FOR TERMINATING OPTICAL CABLES

This application claims the benefits of U.S. Provisional Application No. 60/108,402, filed Nov. 13, 1998, entitled "Method and Apparatus for Precision Assembly," the disclosure of which is incorporated as if fully rewritten herein.

The invention was not made by an agency of the United States Government nor under contract with an agency of the United States Government.

FIELD OF THE INVENTION

This invention relates generally to devices and methods used in the precision assembly of component parts, and specifically to devices and methods for terminating optical cables by connecting optical fibers to optical connectors.

BACKGROUND OF THE INVENTION

Numerous manufacturing processes involving the assembly of component parts require that a first component part be accurately placed within or inserted into a second component. Often these components are extremely small or fragile, and assembly requires devices and methods which are specifically designed to accommodate such components. Satisfactory assembly of these components also depends upon accurate alignment of the components relative to one another such that a precise fit between certain parts is achieved. Furthermore, accurate alignment of a first component and a second component which is to receive and form a union with the first component is also necessary to prevent jamming, fracturing, or breaking of one or both of the components. However, such precise alignment is often difficult and prohibitively expensive to attain because additional steps must be added to existing processes, or special devices must be designed and implemented to achieve acceptable results. Therefore, there is a need for devices and methods that promote precise alignment between components which can be quickly and inexpensively incorporated into existing manufacturing systems. The use of vibratory or wave energy to increase the accuracy and efficiency of existing systems achieves such a result.

Vibratory or wave energy at varying frequencies, amplitudes and power densities can be utilized at different phases of the manufacturing process. Firstly, vibratory or wave energy can be used for mixing two or more adhesive compounds without generating unwanted heat which may cause an adhesive mixture to cure prematurely. Furthermore, a mixing process utilizing vibratory or wave energy can effectively degas the mixed components if the mixed components are liquids. Secondly, vibratory or wave energy facilitates the flow of certain viscous liquids, such as adhesives, into small spaces where wetting of all surfaces is desired, and complete filling of the small space, without voids or gaps is necessary. Thirdly, vibratory or wave energy may be used to promote joining or alignment of close tolerance parts, particularly when these parts are small in size and fragile in nature. The application of vibratory or wave energy tends to naturally center a first part relative to a second part, when the first part must be inserted through an opening in the second part. This effect results from the tendency for a component, part, or other object to seek its lowest energy state. This tendency is a critical element in automating the assembly of fiber optic components, and may be equally useful in the assembly of close tolerance machinery, various electronic components, and other items of manufacture. Fourthly, vibratory or wave energy can be used to heat materials, and may be utilized in heat bonding or heat curing certain materials. Adhesives which normally take minutes or even hours to cure, can be heat-cured in just seconds with the application of vibratory or wave energy. Thus, vibratory or wave energy curing processes can greatly reduce the time required to assemble certain parts.

There are a variety of known uses for vibratory and wave energy in industrial processes. U.S. Pat. No. 4,176,909 to Prunier discloses a process for fixing a connector to a fiber optic cable by ultrasonically welding a connector made of a thermoplastic material to an optical cable while exerting radial compressive force on the assembly. U.S. Pat. No. 4,265,689 to Jeffrey discloses a method of joining glass objects utilizing ultrasonics. U.S. Pat. No. 4,339,247 to Faulkner et al. discloses a method of separating a dissolved gas from a liquid by means of an acoustic transducer. U.S. Pat. No. 4,548,771 to Senapati et al. provides a method for vulcanizing rubber by mean of applying ultrasonic energy. U.S. Pat. No. 4,867,817 to Kneafsey et al. provides a method for activating microencapsulated chemical compositions by sonication. U.S. Pat. No. 5,300,162 to Brockmeyer et al. discloses a process for producing an optical coupler by ultrasonically welding polymeric optical fibers to a plastic tube; and U.S. Pat. No. 5,690,766 to Zwick discloses a method of bonding an integrated circuit chip to a lead frame which includes the step of applying vibrations from an acoustic source to temporarily change adhesive rheology during the manufacturing process. However, the prior art does not address the use of vibratory energy to facilitate precision assembly of components or parts in an industrial process such as the assembly of fiber optic connectors.

Fiber optic technology plays a crucial role in modern communications. However, for fiber optic cables to be useful, optical fibers must be precisely aligned so that the signal from one cable passes to another cable with minimal loss of the signal. The fiber optics industry has developed a number of standard connectors that can be affixed to the ends of optical fibers for precisely positioning the ends of two optical fibers relative to one another. Attaching an optical connector to the end of a fiber optic cable is referred to as a termination. These terminations are produced in large quantities, and due to the extremely close tolerances between the fiber and the connector required for high transmission rates at the connection between fibers, such terminations must conform to exacting requirements to function properly. Optic fiber terminations are typically assembled by trained laborers who perform most or all of the steps manually. The assembly process requires much skill, and due to frequent technician error, the quality of terminations produced is not consistent. Therefore, devices and methods are needed which can effectively automate the assembly process thereby consistently producing high quality optical fiber terminations.

There are four primary aspects to the process for assembling fiber optic terminations: (a) preparing the adhesive or epoxy which is injected into the optical connector, (b) injecting the correct volume of adhesive into the optical connector, (c) accurately inserting the optical fiber into the optical connector, and (d) curing the adhesive within the optical connector following insertion of the optical fiber into the connector. Preparation and curing of the adhesive can be accomplished by utilizing vibratory or wave energy, as previously described. However, additional methods and devices are needed to accomplish the adhesive injection and fiber insertion steps.

As previously stated, the adhesive injection step is currently accomplished manually through the efforts of a skilled technician. Despite skill and training, these efforts still require guesswork, and can produce unacceptable numbers of nonfunctional terminations. Thus, there is a need for an automated adhesive injection system that consistently dispenses the correct amount of adhesive into an optical connector. Several methods are known regarding injection of adhesive into optical connectors. U.S. Pat. No. 5,815,619 to Bloom discloses a fiber optic connector which is hermetically terminated. U.S. Pat. No. 5,858,161 to Nakajima et al. provides a method for assembling a fiber optic connector which includes the use of a specially designed jig for injecting epoxy into a connector, and U.S. Pat. No. 5,913,001 to Nakajima et al. discloses a similar epoxy injection device. However, these methods and devices do not address the issue of automation of the injection process so to minimize technician inconsistency and error.

As with the adhesive injection step, insertion of an optical fiber into an optical connector is also accomplished manually. This manual process is time-consuming and the results are inconsistent and unpredictable; therefore, there is a need for an automated system that can mass produce functional optical fiber terminations quickly and consistently. Currently, there are a variety of known methods and devices for inserting optical fibers into optical connectors to form a termination. See, for example, U.S. Pat. No. 4,666,237 to Mallison, U.S. Pat. No. 4,673,245 to Kling et al., U.S. Pat. No. 4,681,398 to Bailey et al., and U.S. Pat. No. 5,058,984 to Bulman et al. U.S. Pat. No. 5,113,474 to Slaney et al. discloses a hand-held device for assembling fiber optic connectors by application of a selected force which does not break the optical fiber. U.S. Pat. No. 5,235,664 to Okada et al. provides an apparatus for making an optical fiber termination which utilizes a guiding aperture to center the fiber relative to the connector. U.S. Pat. No. 5,261,020 to de Jong et al. provides an optical fiber connector assembly tool which utilizes a crimp tube disposed around the cable to be terminated, and U.S. Pat. No. 5,442,724 to Deuel discloses a hand tool for terminating a fiber optic cable to a connector by crimping the connector itself. U.S. Pat. No. 5,917,975 to Bloom discloses an apparatus for forming a low-stress fit of an optical fiber to a connector by means of heat expansion of the ferrule of a connector. However, the prior art does not provide an integrated, automated system that provides feedback data to the user to ensure high-volume, highly accurate assembly of optical fiber terminations.

BRIEF DESCRIPTION OF THE INVENTION

Accordingly, these and other disadvantages of the prior art are overcome by this invention which provides an integrated, automated, highly accurate system for terminating optical cables. While this system includes both methods and devices for assembling optical fibers and optical connectors, it is important to note that certain aspects of the present invention, namely the various applications of vibratory or wave energy, are applicable to manufacturing and precision assembly in general, and are in no way limited to fiber optic methods and devices.

The present invention provides a system which encompasses the entire process of terminating an optical fiber with an optical connector, and which utilizes data from feedback modules to ensure accuracy and consistency. This invention provides an apparatus and method for preparing adhesive for injection into an optical connector; an apparatus and method for injecting the adhesive into the optical connector; an apparatus and method for inserting a fiber optic cable into the optical connector; and a method for curing the adhesive following insertion of optical fiber into said optical connector.

The system for preparing adhesive for injection into the optical connector includes a device in communication with the adhesive which generates vibratory or wave energy at frequencies and intensities sufficient to mix and de-gas the adhesive, as well as an automated system for mixing and degassing at least two materials. The apparatus for injecting adhesive into an optical connector includes a receptacle for holding the adhesive, and a means for dispensing the adhesive into an optical connector. The apparatus for inserting a fiber optic cable into an optical connector includes a base assembly; a means attached to the base assembly for holding an optical fiber, an optical connector holder positioned opposite the optical fiber, a means for orienting the base assembly and the optical connector holder relative to one another, and a feedback module for centering the optical fiber relative to the optical connector. The optical fiber insertion apparatus includes a device in communication with certain parts of the apparatus for generating vibratory or wave energy at frequencies and intensities which promote the centering of the optical fiber in the optical connector, and which facilitate the assembly of the fiber and connector. The process for curing the adhesive following the insertion of optical fiber into the optical connector includes a device in communication with the optical connector for generating vibratory or wave energy at frequencies and intensities sufficient to heat and cure the adhesive in the optical connector before the terminated optical cable is removed from the assembly apparatus.

Therefore, it is an object of the present invention to provide methods and devices that utilize vibratory or wave energy to facilitate the precision assembly of close tolerance components or parts.

It is a further object of the present invention to provide a manufacturing or assembly process that utilizes vibratory or wave energy to cure adhesive materials.

Another object of the present invention is to provide a manufacturing or assembly process that utilizes vibratory or wave energy to mix and degas materials.

Another object of the present invention is to provide methods and devices for promoting the flow of adhesives into narrow or small regions of components, promoting the wetting of surfaces, and improving the resulting adhesive bond between the components.

Still another object of the present invention to provide an integrated, automated, high-throughput system for terminating fiber optic cables.

Still another object of the present invention is to provide an intelligent system that supplies the user with feedback data to assure a highly accurate and consistent assembly process.

Further objects, advantages, and novel aspects of this invention will become apparent from a consideration of the drawings and subsequent detailed description.

REFERENCE NUMERALS

Optical Cable
10 Fiber Optic Cable
12 Outer Jacket
14 Buffer
16 Optical Fiber
Optical Connector
20 Optical Connector
22 Outer Shell
24 Spring-Loaded Base
26 Ferrule
28 Ferrule Bore 30 Plenum
Mixing and Degassinci Apparatus
40 Mixing and Degassing Apparatus
41 First Tank
42 Second Tank
43 First Pump and Metering Device
44 Second Pump and Metering Device
45 Energy Source
46 Horn
47 Mixing Chamber
48 Vent
49 Third Pump and Metering Device
Adhesive Injection Apparatus
50 Adhesive Injection Apparatus
52 Mounting Bracket
54 Housing
56 Vertical Support Panel
58 Upper Horizontal Panel
60 Lower Horizontal Panel
62 Notch
64 Alignment Rods
66 Clamp
68 Syringe
70 Barrel
72 Needle
74 Plunger
76 Plunger Block
78 Load Cell
80 Motor
82 Control Module
84 Holding Block
86 Cavity
88 Apertures
90 Energy Source
92 Horn
Assembly Apparatus
100 Assembly Apparatus
102 Command Module
104 Motor
106 Positioning Table
108 Lead Screw
110 Base Assembly
112 Traveling Block
114 First Positioning Block
116 Base Plate
118 First Pair of Clamping Arms
120 Second Pair of Clamping Arms
122 First V-Shaped Groove
124 Second V-Shaped Groove
126 Clamping Magnets
128 Hinge Pins
130 Center Alignment Stop
132 Opener Rod
134 Feedback Module
136 Force Transducer
138 Sensor Assembly
140 Optical Connector Holder
142 Vertical Support
144 Mounting Bracket
146 Second Positioning Block
148 Data Processing Unit
150 Energy Source
152 Horn

Reference will now be made in detail to the present preferred embodiment to the invention, examples of which are illustrated in the accompanying drawings.

DETAILED DESCRIPTION OF THE INVENTION AND BEST MODE

There are four primary steps to the process for assembling fiber optic terminations according to the teachings of the present invention: preparation of the adhesive which is injected into the optical connector, injection of the desired volume of adhesive into the optical connector, accurate insertion of the optical fiber into the optical connector, and curing the adhesive within the connector following insertion of the optical fiber into the connector. Each of these steps will be discussed in detail below.

Vibratory or wave energy is utilized throughout the present invention to facilitate the process of terminating fiber optic cables. Vibratory or wave energy is defined as any oscillatory motion that produces mechanical vibration, acoustic, or elastic waves in a component. Vibratory motion can be low frequency or high frequency. In a preferred embodiment of the present invention, low frequency vibration is referred to as vibratory energy, whereas high frequency vibration (at or above 20 kHz) is referred to as wave energy, ultrasonic energy, or ultrasonic vibration. The frequency of the vibration is the inverse of the oscillatory period of the motion. The amplitude and frequency of the oscillatory motion determines the energy or power that results from the vibration. Devices for generating vibratory and wave energy are well known, and the present invention utilizes any appropriate device for generating desired vibratory or wave frequencies and amplitudes.

Figure 1:
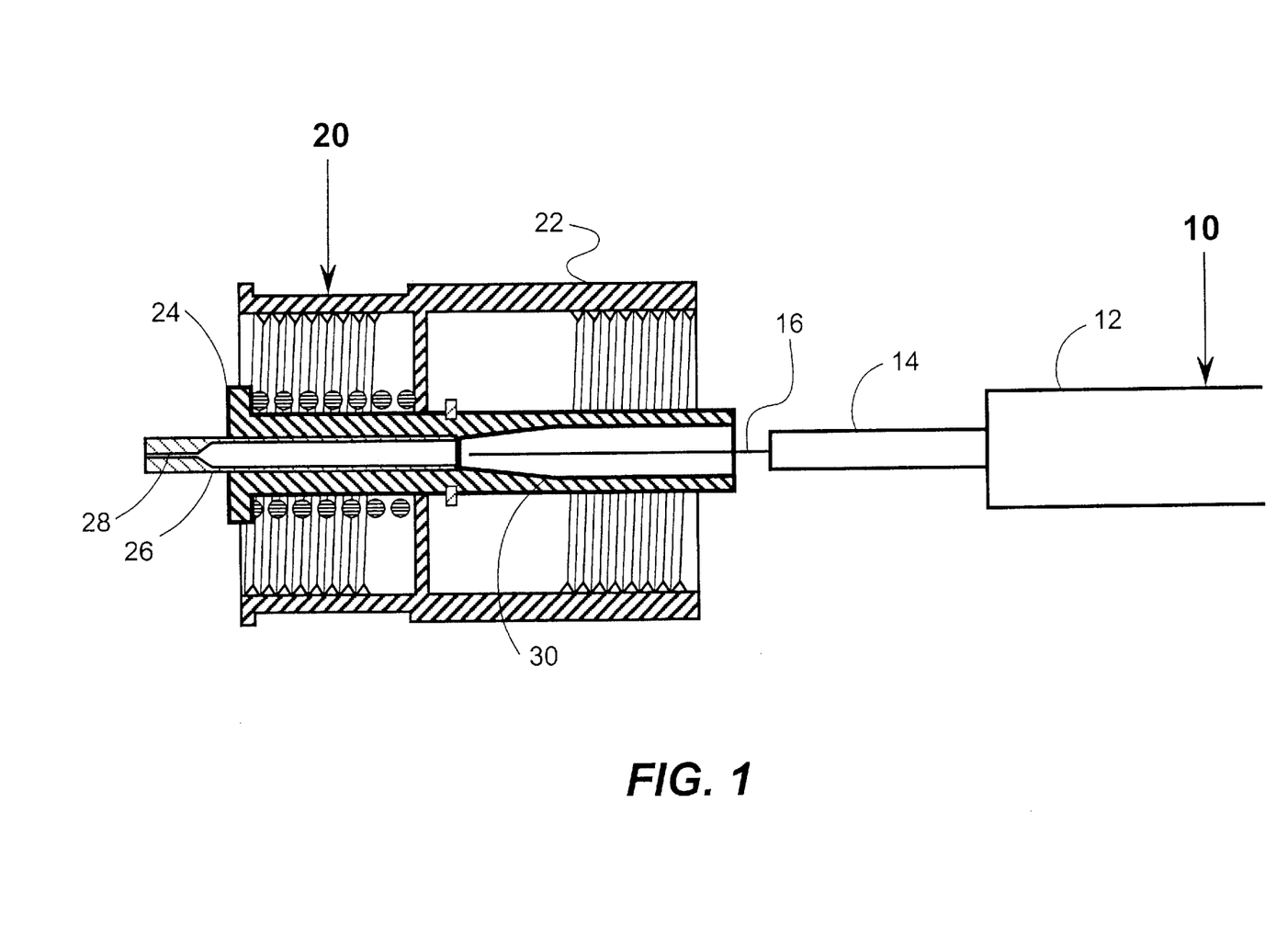
FIG. 1 is a cross-sectional view of a fiber optic connector and a stripped fiber optic cable partially inserted into the fiber optic connector according to the teachings of the present invention.

A preferred embodiment of the present invention includes two workpieces; fiber optic cable 10, and optical connector 20 which is to be attached to optical fiber 16 found at the center of fiber optic cable 10. As best illustrated in FIG. 1, fiber optic cable 10 must be prepared for the termination process. Outer jacket 12 and buffer 14 must be stripped away from optical fiber 16 to which connector 20 will be attached. FIG. 1 also illustrates optical connector 20 which includes an outer shell 22 that surrounds interior components of optical connector 20. Residing within outer shell 22 is spring-loaded base 24 which supports ferrule 26. Spring-loaded base 24 contains plenum 30 through which optical fiber 16 must pass to reach ferrule 26. Ferrule bore 28 passes through the length of ferrule 26, and it is into ferrule bore 28 that optical fiber 16 must be inserted to form the optic fiber termination. It is important to note that optical connectors are manufactured to a variety of specifications, and not all optical connectors have the same components as connector 20 described above. However, the present invention is intended for use with any optical connector used by the fiber optics industry.

Ferrule 26 is typically mass-produced at extremely high tolerances, and the bores of these ferrules are manufactured in 0.25-micron increments. Optical fiber 16 is the light transmitting portion of fiber optic cable 10, and is also manufactured at high tolerances; however, these fibers can differ as much as ±0.5 microns between manufacturers and between different lots. Thus, proper termination of fiber optic cables requires selection of the correctly sized ferrule 26. A typical optical fiber 16 in a fiber optic cable is approximately 125±0.5 microns. The typical diameter of ferrule bore 28 in ferrule 26 is 127±0.5 microns to accommodate for the difference in optical fiber diameters.

Preparation of Adhesives

Figure 2:
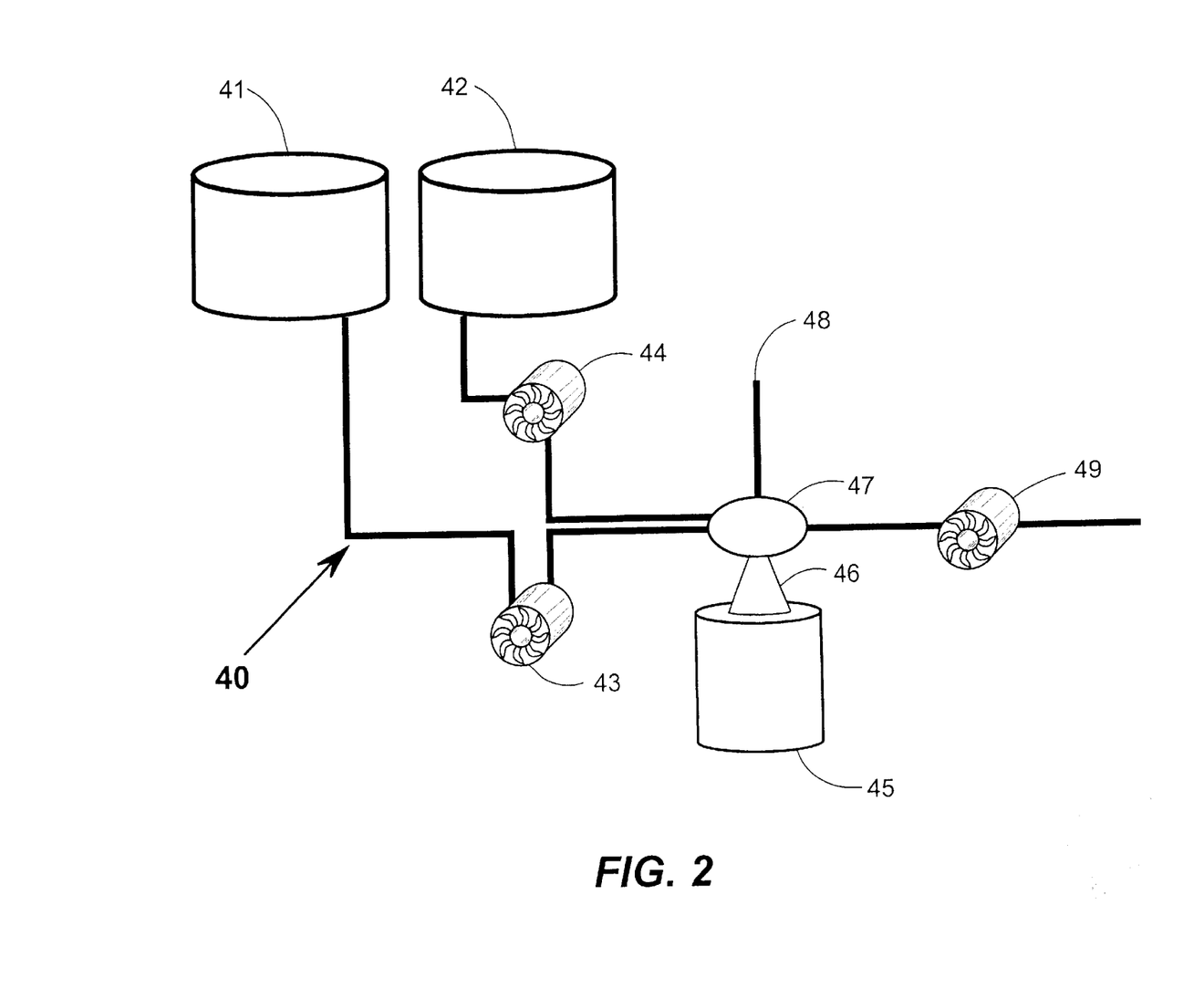
FIG. 2 illustrates a preferred embodiment of a system utilizing vibratory or wave energy to simultaneously mix and degas at least two materials.

Although there are numerous suitable adhesives, the adhesive used to bond optical connectors to optical fibers is typically an epoxy composed of at least two materials which must be mixed and degassed prior to injection into optical connector 20. The present invention provides an apparatus and a process for effectively mixing and degassing this epoxy. FIG. 2 illustrates mixing and degassing apparatus 40. A preferred embodiment of mixing and degassing apparatus 40 utilizes a first tank 41 and a second tank 42 for holding the two materials to be mixed. Additional tanks and associated hardware may be added to mixing and degassing apparatus 40 if other materials are to be included in the mixture. Both first tank 41 and second tank 42 are connected by conduits to first pump and metering device 43 and second pump and metering device 44 which deliver the desired amount of material from first tank 41 and second tank 42 to mixing chamber 47. As the materials to be mixed flow into and through mixing chamber 47, horn 46 transfers vibratory or wave energy from energy source 45 to mixing chamber 47. Horn 46 is any device sufficient to transfer vibratory or wave energy between components. This vibratory or wave energy mixes and degasses the materials in mixing chamber 47. Unwanted gases generated by the mixing process are vented from mixing chamber 47 by vent 48. After the materials have been mixed and degassed, third pump and metering device 49 transports the adhesive to a device used for injecting the adhesive into optical connector 20.

In a preferred embodiment of the present invention mixing chamber 47 has a smooth interior shape without sharp edges or corners. For example, mixing chamber 47 may be spherical, ellipsoid, or cylindrical. Although an angular shape can be employed, a smooth interior for mixing chamber 47 minimizes the vibratory or wave energy source 45 must provide for adequate mixing and degassing. Furthermore, energy transfer from energy source 45 to mixing chamber 47 is optimized when mixing chamber 47 is designed to resonate or is manufactured from materials which resonate naturally.

Typically, the electrical power, transducer frequency, and time will be monitored by mixing and degassing apparatus 40. The electrical power multiplied by the efficiency of the transducer will determine the vibratory or wave energy provided to mixing chamber 47 by energy source 45. Thus, by varying the power, frequency and time period, mixing and degassing apparatus 40 can be used to mix and degas a variety of materials having different physical characteristics.

The power level, time period, and frequency at which the vibratory or wave energy is supplied to mixing chamber 47 are dependent on the materials to be mixed, their viscosity, and their respective flow rates. In a preferred embodiment of this invention, a power level of about 1 to 10 watts applied for about 0.5 to 5 seconds is sufficient to mix 0.5 to 5 cc of epoxy, and a power level of about 1 to 100 watts applied for about 1 to 10 seconds is sufficient to degas 0.5 to 5 cc of epoxy. In a broadly useful embodiment of the present invention, a frequency range between about 60 Hz to 100,000 Hz is desirable for most materials. A preferred frequency range of 20,000 to 60,000 Hz is desirable for preparation of small volumes of adhesive. The amplitude of the vibrations must be limited to avoid damage to mixing chamber 47 and any of the associated hardware. If large amplitudes are required, mixing chamber 47 may be isolated from the rest of mixing and degassing apparatus 40 to minimize the risk of damage to the associated hardware.

The energy density of the vibrations applied to mixing chamber 47 must be kept sufficiently low to avoid appreciable heating of the materials being mixed if the final product is a heat-cured epoxy, heat sensitive material, or heat reactive material. To avoid heating the materials to be mixed, a vibrational frequency of about 120 Hz with an amplitude of approximately 0.025 inches is adequate for controlled mixing of the materials. A vibrational frequency of 20 kHz with a vibrational amplitude of 0.001 inches may produce very rapid mixing, degassing, and curing of the epoxy, but heating of the epoxy is likely to occur. Therefore, the energy density at 20 kHz should generally not exceed 2 watts per cubic centimeter. While 2 watts per cubic centimeter appears to be the practical maximum energy density for mixing two-part epoxies, appropriate energy densities ultimately depend upon the materials being mixed. Higher energy densities may be useful for more viscous materials.

Injection of Adhesive into an Optical Connector

Following mixing and degassing, the adhesive must be injected into optical connector 20. The final quality of fiber optic cable terminations depends upon consistently dispensing between about 0.5 and 3.0 mg of epoxy into ferrule bore 28 and plenum 30. This process is challenging because: (a) the volume of epoxy dispensed into the connector is extremely small; (b) at least half of the epoxy dispensed must be forced through a ferrule which is 8 to 15 mm long and has a diameter of 127 $\mu$m; (c) the epoxy's viscosity changes drastically over its pot life; and (d) the epoxy must be dispensed in two specific regions of the connector: ferrule bore 28 and plenum 30. The present invention overcomes these difficulties, and a preferred embodiment includes an apparatus and a method for injecting a desired amount of adhesive into optical connector 20.

Figure 3:
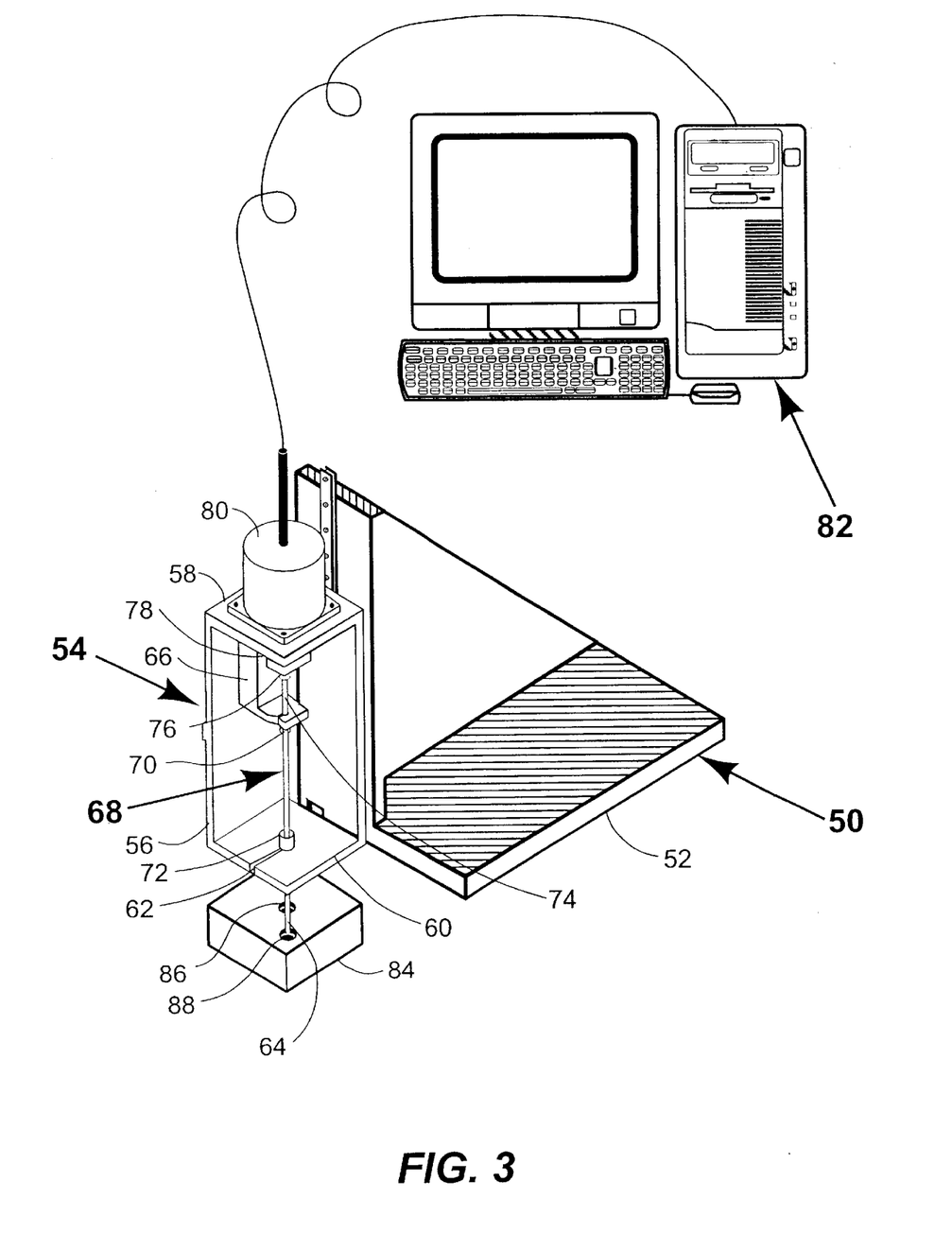
FIG. 3 illustrates a preferred embodiment of the adhesive injection apparatus according to the teachings of the present invention.
Figure 4A:
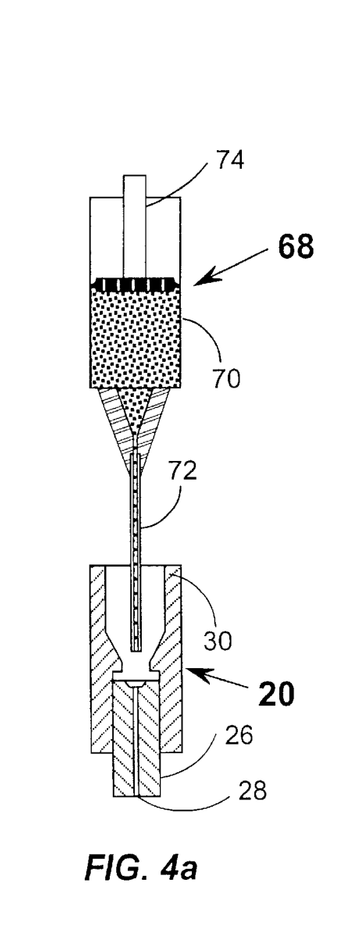
FIG. 4a–e illustrate a preferred embodiment of the process for injecting adhesive in an optical connector according to the teachings of the present invention.
Figure 4B:
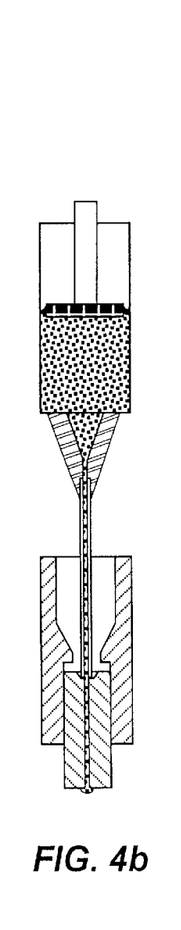
Figure 4C:
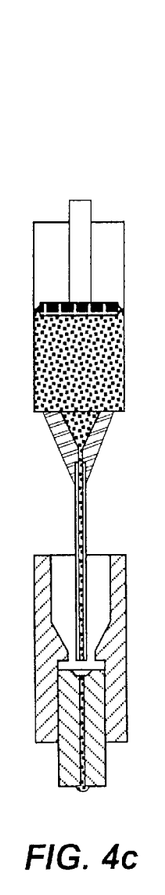
Figure 4D:
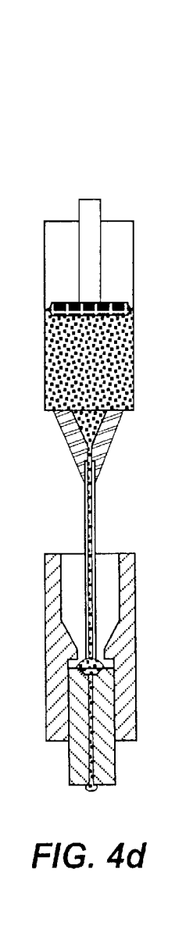
Figure 4E:
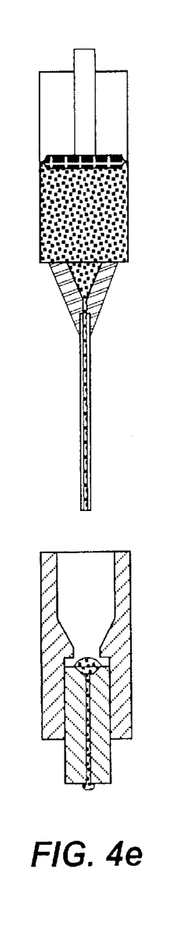

As illustrated in FIG. 3, an adhesive injection apparatus 50, according to a preferred embodiment of the present invention comprises a mounting bracket 52 for adjustably supporting adhesive injection apparatus 50. Housing 54 includes upper horizontal panel 58 and lower horizontal panel 60 which are separated and supported by at least one vertical support panel 56. Lower horizontal panel 60 includes a notch 62 and at least two alignment rods 64 which project downwardly from lower horizontal panel 60. Clamp 66 is affixed to vertical support panel 56 and secures syringe 68 which includes barrel 70, plunger 74 residing in barrel 70, and needle 72 attached to barrel 70 opposite plunger 74. Plunger block 76 is attached to plunger 74, as is load cell 78. Motor 80 is attached to plunger block 76 and is controlled by control module 82. Holding block 84, which includes cavity 86, is positioned beneath lower horizontal panel 60 and is held in place by alignment rods 64 which are inserted into apertures 88.

According to a preferred embodiment of the present invention, adhesive injection apparatus 50 is operated as follows. Mixed and degassed adhesive is transferred into barrel 70, plunger 74 is inserted into barrel 70, needle 72 is attached to barrel 70, and syringe 68 is secured in clamp 66. Needle 72 passes through notch 62, and plunger 74 is secured in plunger block 76. Optical connector 20 is placed in cavity 86 and holding block 84 is secured against lower horizontal panel 60, and automatically aligned with needle 72 by inserting alignment rods 64 into apertures 88. Control module 82 instructs motor 80 to inject adhesive into optical connector 20. In one embodiment of this invention, load cell 78 provides viscosity data to control module 82 to actively gauge where the epoxy is in its pot life, and to determine how long each injection step must dwell for the epoxy to completely flow into optical connector 20.

In one embodiment of the present invention, adhesive injection apparatus 50 includes a sensor (not shown) attached to holding block 84 which provides feedback as to when needle 72 is fully-bottomed out in ferrule 26. In another embodiment, motor 80 is a stepper motor. In still another embodiment, syringe 68 is replaced by any receptacle which may be inserted into optical connector 20 which is secured by holding block 84. Adhesive is pumped from this receptacle into optical connector 20 by any suitable means. In still another embodiment, alignment rods 64 are replaced by at least two hemispherical projections, and apertures 88 are replaced by at least two hemispherical cavities which align with the hemispherical projections.

FIG. 4a–e depicts the steps of the method of the present invention for injecting a desired amount of adhesive into optical connector 20 using adhesive injection apparatus 50. A broad embodiment of the adhesive injection method of the present invention includes two basic steps: (i) needle 72 seals against the back of ferrule 26 and fills ferrule bore 28 with adhesive, and (ii) needle 72 is retracted slightly and a bead of adhesive is placed behind ferrule 26. A preferred embodiment of the adhesive injection method of the present invention includes the following steps: (a) load prepared adhesive into syringe 68; (b) place syringe 68 into clamp 66; (c) center and secure holding block 84 containing optical connector 20 beneath lower horizontal panel 60; (d) center and lower needle 72 into the back of optical connector 20; (e) command motor 80 to dispense roughly one-half to three-quarters of the adhesive into ferrule bore 28; (f) raise syringe 68 about 0.005 inches; (g) command motor 80 to inject the remaining volume of the adhesive into plenum 30; (h) retract syringe 68 from optical connector 20; and (i) remove adhesive-filled optical connector from holding block 84. Preferably, the flow rate of the adhesive is equal to or less than about 0.2 milligrams per second.

Either optical connector 20, needle 72, or both can be subjected to vibratory or wave energy to speed the delivery of the adhesive into ferrule bore 28 and plenum 30. Utilization of vibratory or wave energy during the adhesive injection process will also reduce the effects of viscosity on the injection apparatus, thereby extending the useable pot life of the adhesive. Furthermore, vibratory energy promotes the continued de-gassing of the adhesive ensuring that no air bubbles or voids exists in the adhesive when it has cured. An air bubble or void in the adhesive next to optical fiber 16 will diminish the performance of the optical cable.

Figure 5:
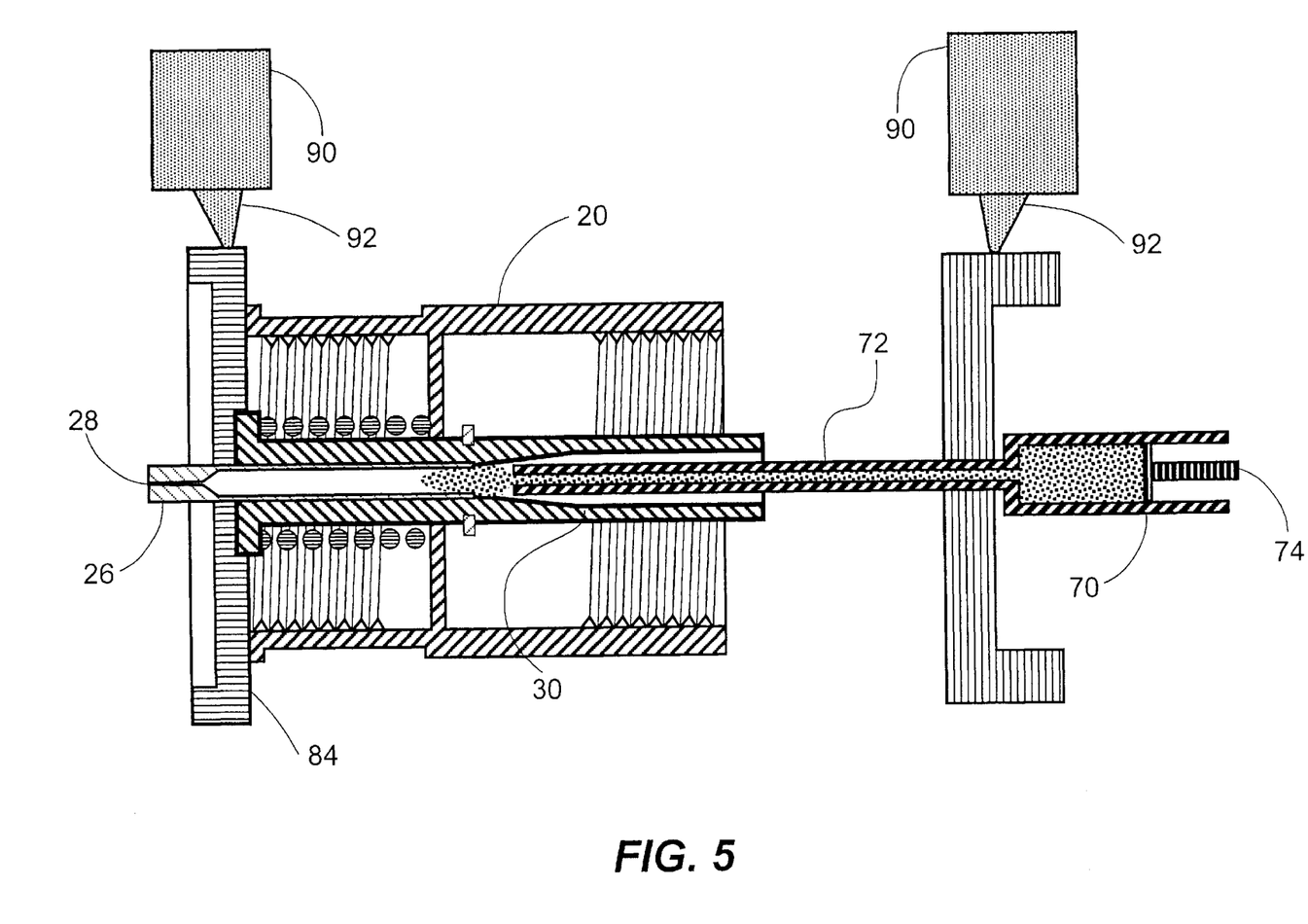
FIG. 5 is a cross-sectional illustration of an embodiment of the present invention utilizing vibratory or wave energy to facilitate the injection of adhesive into a fiber optic connector.

FIG. 5 illustrates the use of vibratory or wave energy as part of the apparatus and method utilized to inject an adhesive into optical connector 20. In FIG. 5, adhesive injection apparatus 50 is shown utilizing two energy sources 90 each having an associated horn 92. Horns 92 are any devices sufficient to transfer vibratory or wave energy between components. Each horn 92 transmits vibratory or wave energy to the component of adhesive injection apparatus 50 that it is communication with. In FIG. 5, horns 92 are in communication with both needle 72 and holding block 84. In a preferred embodiment horns 92 form an interference fit with the component of adhesive injection apparatus 50 that the horns transmit vibratory or wave energy to. In another embodiment, transmission of vibratory or wave energy is accomplished by any method which will sufficiently transmit vibratory or wave energy to the desired component of adhesive injection apparatus 50.

As previously discussed, the power level, time period, and frequency at which the vibratory or wave energy is supplied must be controlled to prevent adverse heating effects on the adhesive, while simultaneously promoting the injection and degasification of the adhesive. In a broadly useful embodiment of this invention, a frequency range of 60 Hz to 40 kHz is acceptable for mixing, degassing, and promoting delivery of the adhesive; however, the physical characteristics of the adhesive will determine the narrower ranges that can be utilized. Lower frequencies within the 60 Hz to 40 kHz range promote thorough mixing and degasification of the materials without causing significant heating. However, higher frequencies within the 60 Hz to 40 kHz are more likely to initiate exothermic reactions which may result in premature curing of the adhesive. Therefore, at higher frequencies the power density must be carefully controlled; for example, at 20 kHz it is preferable to not exceed 2 watts per cubic centimeter when the adhesive is a two-part epoxy. For the frequency range of 10 kHz to 40 kHz, preferred power levels are typically in the range of 0.5 to 5 watts per cubic centimeter, with higher frequencies utilizing lower power levels.

Insertion of Optical Fiber into Optical Connector

Figure 6:
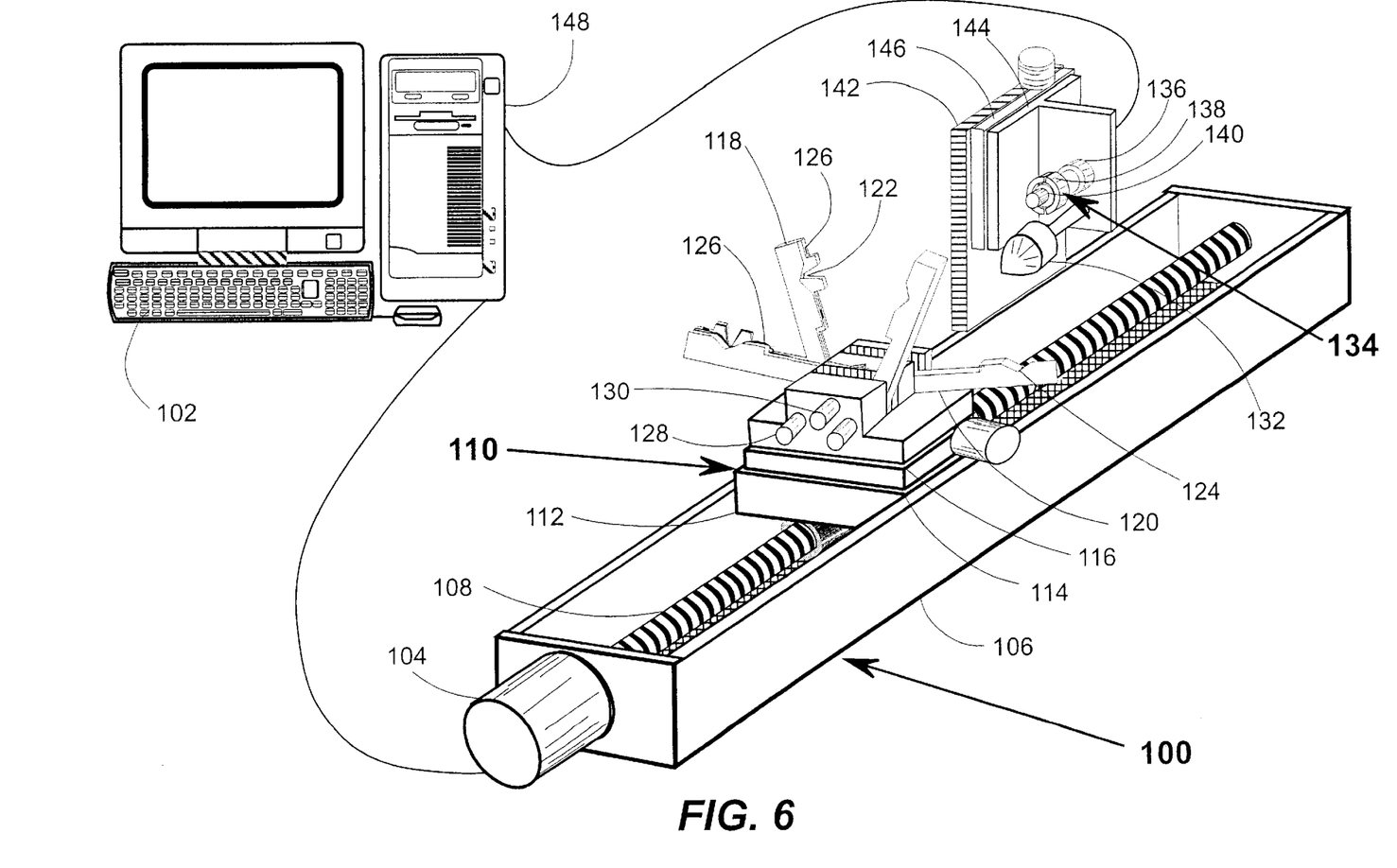
FIG. 6 illustrates a preferred embodiment of the optical fiber and optical connector assembly apparatus according to the teachings of the present invention.

Following the injection of adhesive into optical connector 20, optical fiber 16 must be inserted into optical connector 20 to form the termination of fiber optic cable 10. The present invention includes an apparatus and method for assembling optical connector 20 and optical fiber 16 to form a functional termination. As best shown in FIG. 6, assembly apparatus 100, according to a preferred embodiment of the present invention, comprises a command module 102 which controls the motion of motor 104. Motor 104 is attached to lead screw 108 of positioning table 106. Positioning table 106 includes traveling block 112 which moves either forward or in reverse in a linear fashion due to the motion of lead screw 108 which is actuated by motor 104. Base assembly 110 includes traveling block 112, first positioning block 114, which is attached to the top of traveling block 112, and base plate 116 which is attached to the top of first positioning block 114. First positioning block 114 permits base plate 116 to be raised, lowered, or otherwise positioned. Base plate 116 includes a first pair of clamping arms 118 and a second pair of clamping arms 120 which are attached to base plate 116 by hinge pins 128. Interposed between first pair of clamping arms 118 and second pair of clamping arms 120 is center alignment stop 130 which prevents first pair of clamping arms 118 and second pair of clamping arms 120 from moving past the vertical position when the arms are clamped together. In FIG. 6, first pair of clamping arms 118 and second pair of clamping arms 120 are both shown in the open, or horizontal, position. Clamping magnets 126 are recessed on the inner surfaces of both first pair of clamping arms 118 and second pair of clamping arms 120, and hold the clamping arms together in the vertical position. First V-shaped groove 122 is recessed into the arms of first pair of clamping arms 118, and holds fiber optical cable 16 by outer jacket 12. Second V-shaped groove 124 is recessed into the arms of second pair of clamping arms 120, and holds fiber optical cable 16 by buffer 14. Vertical support 142 is attached to positioning table 106. Second positioning block 146 is attached to vertical support 142 and mounting bracket 144 is attached to positioning block 146. Second positioning block 146 permits mounting bracket 144 to be raised, lowered, or otherwise positioned. Mounting bracket 144 supports feedback module 134 and opener rod 132. Feedback module 134 includes force transducer 136, sensor assembly 138, and optical connector holder 140. Data processing unit 148 receives information from feedback module 134 regarding the centering of optical fiber 16 in optical connector 20.

According to a preferred embodiment of the present invention, assembly apparatus 100 is operated as follows. Outer jacket 12 of fiber optic cable 10 is stripped to expose a length of buffer 14 and a length of optical fiber 16. Stripped optical cable 10 is placed into V-shaped grooves 122 and 124 with optical fiber 16 facing optical connector 140. Clamping arms 118 and 120 are closed and held in place by clamping magnets 126. Clamping arms 118 and 120 do not actually touch the glass of optical fiber 16, rather they secure fiber optic cable 10 by buffer 14. Adhesive filled optical connector 20 is secured in optical connector holder 140 with plenum 30 facing optical fiber 16. Base assembly 110 and mounting bracket 144 are oriented relative to one another by fine adjustments of first positioning block 114 and second positioning block 146 to center optical fiber 16 and optical connector 20. Command module 102 instructs motor 104 to rotate lead screw 108, thereby advancing base assembly 110 toward optical connector 20. As optical fiber 16 enters optical connector 20, opener rod 132 forces open second pair of clamping 120. Opener rod 132 is positioned such that second pair of clamping arms 120 guide optical fiber 16 into optical connector 20 without second pair of clamping arms 120 contacting plenum 30. After second pair of clamping arms 120 release fiber optic cable 10, first pair of clamping arms 118 continue to grip fiber optic cable 10 and complete the insertion into optical connector 20.

As optical fiber 16 enters optical connector 20, feedback module 134 transmits information regarding the positioning of optical fiber 16 within optical connector 20 to data processing unit 148. Force transducer 136 measures the dynamic forces experienced by optical fiber 16 as it enters optical connector 20 and compares the data to a predetermined threshold above which a glass fiber will be damaged. If optical fiber 16 or buffer 14 get caught on ferrule 26 or plenum 30 without entering ferrule bore 28, force transducer 136 detects the misalignment, displays the data on data processing unit 148, and the operation of assembly apparatus 100 is interrupted. The direction of base assembly 110 is then reversed, optical fiber 16 is removed from optical connector 20, optical connector 20 is rotated from 0 to 360 degrees, and the insertion is re-attempted until successful insertion is achieved. Sensor assembly 138 includes a light source and a light sensor. When optical fiber 16 correctly enters ferrule bore 28, the fiber will pass entirely though ferrule bore 28 and emerge at the opposite end of ferrule bore 28. Sensor assembly 138 detects the emerging fiber and sends information to data processing unit 148 to indicate the successful insertion of optical fiber 16 into ferrule bore 28. The data indicating successful insertion is displayed on data processing unit 148.

In another embodiment of the present invention, clamping arms 118 and 120 are part of a series of clamping arms, each opened in sequence by opener rod 132 as fiber optic cable 10 is advanced toward optical connector 20. In another embodiment of the present invention, clamping arms 118 and 120 are replaced by an iris that closes to a small diameter to grip and center optical fiber 16, and which then opens to a large diameter to pass optical connector 20 and optical connector holder 140. In still another embodiment of the present invention, clamping arms 118 and 120 are replaced by a series of rollers which align and feed fiber optic cable 10 into optical connector 20. In yet another embodiment, buffer 14 of fiber optic cable 10 is tapered so that its leading edge is beveled rather than perpendicular to optical fiber 16.

Figure 7:
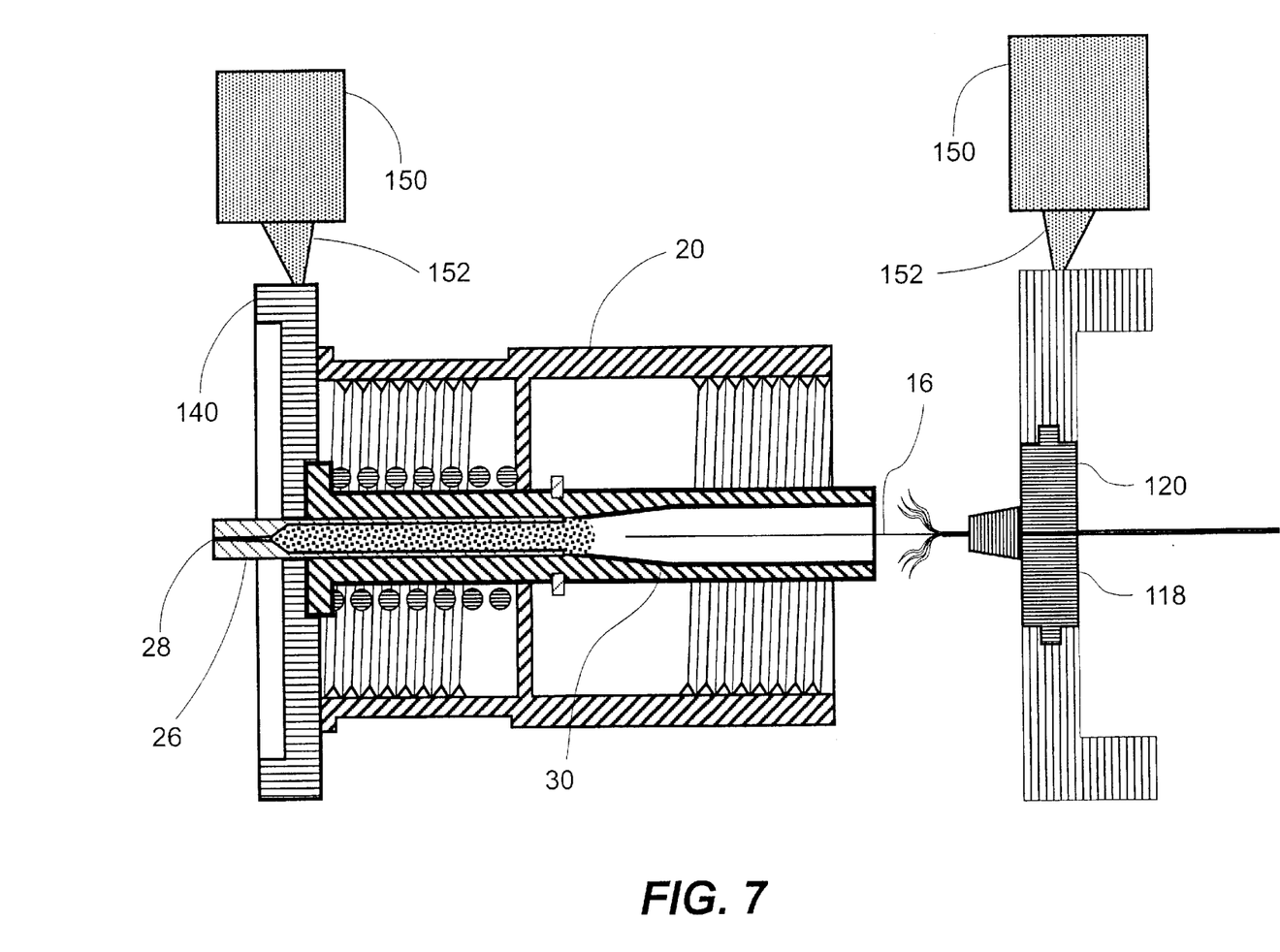
FIG. 7 is a cross-sectional illustration of an embodiment of the present invention utilizing vibratory or wave energy to promote the centering of an optical fiber within an optical connector, and to facilitate the assembly of an optical fiber and optical connector.

As illustrated in FIG. 7, vibratory or wave energy can be applied to assembly apparatus 100 to promote the centering of optical fiber 16 in ferrule bore 28. By applying vibratory or wave energy to either optical fiber 16 or optical connector 20, optical fiber 16 tends to seek ferrule bore 28 because it is the low energy point in the vibrating system. In FIG. 7, assembly apparatus 100 is shown utilizing two vibratory energy sources 150, each having an associated horn 152. Horns 152 are any devices sufficient to transfer vibratory or wave energy between components. Each horn 152 transmits vibratory energy to the component of assembly apparatus 100 that it contacts. In FIG. 7, horns 152 are in communication with second pair of clamping arms 120 and optical connector 20. In a preferred embodiment horns 152 form an interference fit between the horns and the component of assembly apparatus 100 that the horns transmit vibratory or wave energy to. In another embodiment, transmission of vibratory or wave energy is accomplished by any method which will sufficiently transmit vibratory or wave energy to the desired component of assembly apparatus 100.

The vibratory or wave energy applied to assembly apparatus 100 to promote the centering of optical fiber 16 in ferrule bore 28 may be applied axially or transversely. In one embodiment the vibratory or wave energy is supplied by energy source 150, which is any acceptable device for generating such energy. In another embodiment, vibratory energy is supplied by the axial, intermittent motion of motor 104 as it incrementally moves fiber optic cable 10 or optical connector 20. The frequency range for inserting and guiding the optical fiber 16 into connector 20 can be much broader than that used for mixing and injecting the adhesive into connector 20. A frequency range from one Hz to one MHz could be utilized. The types of sensors, control systems, and insertion apparatus utilized, together with the technique and direction used to apply the vibratory energy, influence the frequency selection. Most applications preferably employ frequencies of 100 kHz or less. Preferably, vibratory or wave energy is applied to assembly apparatus 100 at a frequency of about 20,000 to 60,000 Hz. A power level of about 1 to 10 watts is preferred to promote insertion. The application of vibratory or wave energy must occur before the tip of optical fiber 16 passes the plane of the back of ferrule 26, and if it is applied sooner, the vibratory or wave energy reduces the friction force of optical fiber 16 if it is riding along the inner surface of the rear of plenum 30. The vibratory energy must be applied at least until the tip of fiber 16 is known to have passed the rear of ferrule 26 and entered ferrule bore 28.

Continued application of vibratory energy reduces friction as optical fiber 16 continues to advance to its final seating position.

In one embodiment of the present invention, vibratory or wave energy is applied to optical connector 20 as optical fiber 16 is inserted manually into optical connector 20. In another embodiment of the present invention, vibratory or wave energy is used in combination with a force sensor to promote insertion of optical fiber 16 into ferrule bore 28.

Curing of Adhesive in the Optical Connector

Figure 8:
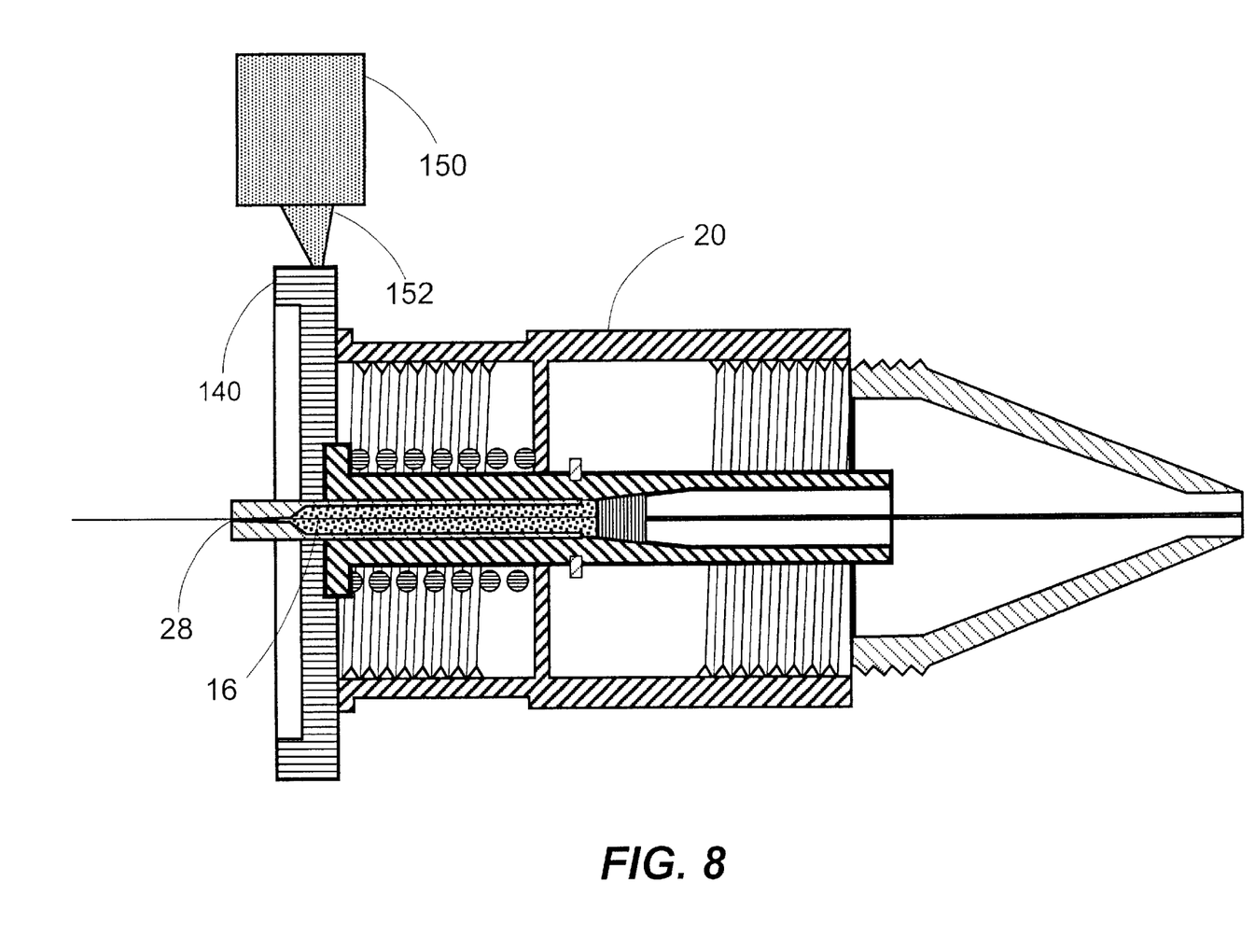
FIG. 8 is a cross-sectional illustration of an embodiment of the present invention utilizing vibratory or wave energy to cure the adhesive used in bonding an optical fiber to an optical connector.

Following the successful insertion of optical fiber 16 into ferrule bore 28 of optical connector 20, the adhesive in optical connector 20 must be cured to prevent optical fiber 16 from pulling loose from ferrule bore 28. According to teachings of the present invention, vibratory energy may be applied to the adhesive residing within optical connector 20 to quickly cure the adhesive. Application vibratory or wave energy to the adhesive within optical connector 20 generates sufficient heat to polymerize or cure the adhesive. As illustrated in FIG. 8, vibratory energy source 150 transmits vibratory energy to optical connector 20 through horn 152. Horn 152 is any device sufficient to transfer vibratory or wave energy between components. In a preferred embodiment horn 152 forms an interference fit between the horn and optical connector 20. In another embodiment, transmission of vibratory energy is accomplished by any method which will sufficiently transmit vibratory energy to optical connector 20. Application of vibratory energy to connector 20 can be radial or axial and may be at frequencies of about 1000 to 1,000,000 Hz. Preferably, the frequency range is about 20,000 to 100,000 Hz.

In another embodiment of the present invention, curing by vibratory or ultrasonic heating of the adhesive is replaced by a pre-heating method. This pre-heating method includes the steps of (a) mixing and degassing the adhesive; (b) rapidly heating said adhesive to a temperature suitable for rapid curing; (c) rapidly injecting the adhesive into optical connector 20; (d) rapidly inserting optical fiber 16 into optical connector 20; and (e) preventing any movement of optical fiber 16 prior to the curing of the adhesive. In this embodiment, heating the adhesive is accomplished by conventional means such as electrical resistance or by flame, or by applying vibratory energy to the adhesive prior to injection in optical connector 20.

In still another embodiment, connector 20 is preheated prior to injection of preheated adhesive into connector 20. Preheating connector 20 ensures that the adhesive will remain at its cure temperature until complete curing has actually occurred.

The present invention provides many advantages over the prior art including the following: (a) effective utilization of vibratory energy to improve industrial processes involving the precision assembly of close-tolerance components or parts; (b) effective utilization of vibratory energy to mix, degas, and cure adhesives used in industrial processes; (c) a fully integrated system providing methods and devices that encompass the entire process of terminating a fiber optic cable by assembling an optical fiber and optical connector; (d) automation of the process of terminating a fiber optic cable by assembling an optical fiber and optical connector which greatly increases manufacturing output and virtually eliminates technician error; and (e) feedback modules, incorporated into the system which provide the user with data and other information that greatly improves the accuracy and consistency of the assembly process.

While the above description contains many specificities, these should not be construed as limitations on the scope of the invention, but rather as exemplification of preferred embodiments. Numerous other variations of the present invention are possible, and it is not intended herein to mention all of the possible equivalent forms or ramifications of this invention. Various changes may be made to the present invention without departing from the scope of the invention, and the following are examples of such changes.

Vibratory and wave processes similar to those provided by the present invention can be utilized for mounting integrated circuits onto circuit boards with a process similar to that used in surface mount technology, the integrated circuits could be epoxied directly to the circuit board together with the electrical leads. If an epoxy was utilized to fasten the pin connections, then an epoxy capable of transmitting electricity must be used at those connections. Alternatively, the vibratory energy source could be attached to an individual pin connection, or to all the pin connections, and the heat generated by the vibratory energy would be sufficient to cause local melting and bonding of the electrical connections.

A further use for the vibratory or wave assisted manufacturing could be used in any close tolerance assembly process where it is desirable to assemble or joining two or more parts together to form a single assembly. This vibratory assisted assembly process would be particularly useful where close tolerance interference fits are utilized. Another useful application would be when relatively fragile parts are joined together with relatively close tolerances and where relatively high forces or even relatively low forces could damage the parts as they are assembled.

We claim:

1. A method for insertably assembling a plurality of components, the method comprising the steps of:
    (a) applying vibratory or wave energy having a frequency of at least about one kilohertz to at least one of the plurality of components to be assembled, the plurality of components comprising a first component and at least a second component, and
    (b) urging the first component and at least the second component together, whereby the first component and at least the second component become assembled.

2. A method for insertably engaging at least a first component with at least a second component, the method comprising the steps of:
    (a) applying vibratory or wave energy having a frequency of at least about one kilohertz to at least the first component and
    (b) urging at least the first component and at least the second component together, whereby the components become engaged.

3. A method for inserting a first component into a second component, the method comprising the steps of:
    (a) applying vibratory or wave energy to the first component, the second component, or both and
    (b) urging the first component and the second component together, whereby the first component becomes inserted into the second component.

4. The method of claim 3, wherein the first component is an optical fiber.

5. The method of claim 3, wherein the second component is an optical connector.

6. A method for insertably joining a first component with a second component to form an assembly, the method comprising:
    (a) injecting an adhesive into the second component;
    (b) applying vibratory or wave energy having a frequency of at least about one kilohertz to the first component, the second component, or both components; and (c) urging the first component into the second component, whereby the components become joined.

7. The method of claim 6, wherein the adhesive is a multi-part epoxy.

8. The method of claim 6, the method further comprising the step of curing the adhesive by applying vibratory or wave energy to the assembly.

9. The method of claim 6, wherein the first component is an optical fiber.

10. The method of claim 6, wherein the second component is an optical connector.

11. The method of claim 6, wherein the step of injecting the adhesive into the second component is accompanied by applying vibratory or wave energy to the adhesive.

12. A method for injecting a liquid into a void formed within a component, the method comprising the steps of:
   (a) placing the liquid into an injection means;
   (b) applying vibratory or wave energy to one or more of the liquid, the injection means, or the component;
   (c) placing the injection means in close proximity to the void; and
   (d) injecting the liquid into the void.

13. The method of claim 12, wherein the liquid is an adhesive.

14. The method of claim 13, wherein the adhesive is a multi-part epoxy.

15. The method of claim 12, wherein the component is an optical connector.

16. The method of claim 15, wherein the void is a ferrule.

17. A method for attaching an optical connector to an optical fiber, the method comprising the steps of:
   (a) placing the components of a multi-part adhesive together in a receptacle;
   (b) mixing and degassing the components by applying vibratory or wave energy to the components;
   (c) placing the adhesive mixture into an injecting means;
   (d) applying vibratory or wave energy to one or more of the injecting means, the connector, or the adhesive mixture;
   (e) placing the injecting means in close proximity to the connector;
   (f) injecting the adhesive into the connector;
   (g) removing the injecting means from close proximity to the connector;
   (h) applying vibratory or wave energy to the connector, the fiber, or both; and
   (i) urging the fiber into the connector.

18. The method of claim 17, further including the step of applying vibratory or wave energy to partially or completely cure the adhesive.

19. The method of claim 17, wherein the connector is formed to include a ferrule and a ferrule bore, the adhesive is injected into the ferrule and the ferrule bore, and the fiber is inserted into the ferrule and the ferrule bore.

20. A method for injecting a liquid through a conduit into a void formed within a component, the method comprising the steps of:
   (a) securing the conduit to a frame;
   (b) placing the liquid into the conduit;
   (c) securing the component to the frame, wherein the void is facing the conduit;
   (d) aligning the void with the conduit, wherein the void and the conduit are substantially coaxial;
   (e) moving the conduit into close proximity to the component; and
   (f) injecting the liquid into the void while applying vibratory or wave energy to the conduit, the component, the liquid, or any combination thereof.

21. The method of claim 20, wherein step (a) and step (b) are reversed, whereby step (b) precedes step (a).

22. The method of claim 20, wherein the liquid is an epoxy adhesive.

23. The method of claim 20, wherein the injection step is effected by a motor controlled by a control module.

24. The method of claim 23, wherein a load cell in communication with an injection means and in communication with the motor provides force load data to the control module.

25. The method of claim 23, further including the step of the control module calculating the length of the injection.

26. A method for inserting a first component into a void formed in a second component, the method comprising the steps of:
   (a) securing the first component;
   (b) securing the second component;
   (c) aligning the first component to be substantially coaxial with the void in the second component;
   (d) applying vibratory or wave energy having a frequency of at least about one kilohertz to the first component, the second component, or both; and
   (e) urging the first component and the second component together, whereby the first component is inserted into the void in the second component.

27. The method of claim 26, wherein the second component is an optical connector and the void is a ferrule bore.

28. The method of claim 26, wherein the first component is an optical fiber.

29. The method of claim 26, wherein the step of urging the first component and the second component together is controlled by a control module, whereby the control module halts or reverses the advancing means when the advancing force reaches a predetermined level.

30. A method for injecting adhesive into an optical connector, the method comprising the steps of:
   (a) loading the adhesive into a conduit;
   (b) securing the conduit to an adhesive injection apparatus, the injection apparatus comprising means for urging the adhesive out of the conduit and into the optical connector, the injection apparatus further comprising means for securing the optical connector, the optical connector formed to include a ferrule, the ferrule further formed to include a plenum;
   (c) aligning the conduit with the ferrule;
   (d) inserting the conduit into the optical connector, whereby the conduit contacts the ferrule;
   (e) injecting a portion of the adhesive into the ferrule;
   (f) retracting the conduit from contact with the ferrule;
   (g) injecting the remaining portion of the adhesive into the ferrule, whereby a bead of adhesive is formed within the plenum of the ferrule; and
   (h) retracting the conduit from the optical connector.

31. The method of claim 30, wherein the conduit is a syringe.

32. The method of claim 30, further including the step of applying vibratory or wave energy to the adhesive, the syringe, the connector, or any combination thereof while injecting a portion of the adhesive into the ferrule.

33. The method claim 30, wherein the steps of injecting the adhesive are effected by a motorized plunger.

34. The method of claim 33, wherein the motorized plunger is controlled by a control module.

35. A method for promoting the flow of a liquid in a conduit, the method comprising the step of applying vibratory or wave energy to the liquid.

36. The method of claim 35, wherein the liquid is an epoxy.

37. The method of claim 35, wherein the conduit is a syringe.

38. The method of claim 35, wherein the conduit is a ferrule.

39. The method of claim 35, wherein the conduit is a ferrule bore.

40. The method of claim 1, wherein the frequency is at least about 20 kilohertz.

41. The method of claim 2, wherein the frequency is at least about 20 kilohertz.

42. The method of claim 3, wherein the frequency is at least about 20 kilohertz.

43. The method of claim 1, wherein the vibratory or wave energy is applied while the first component and at least the second component are being urged together.

44. The method of claim 2, wherein the vibratory or wave energy is applied while the first component and at least the second component are being urged together.

45. The method of claim 3, wherein the vibratory or wave energy is applied while the first component and the second component are being urged together.

46. The method of claim 6, wherein the vibratory or wave energy is applied while the first component is being urged into the second component.

47. The method of claim 6, wherein the frequency is at least about 20 kilohertz.

48. The method of claim 26, wherein the frequency is at least about 20 kilohertz.

* * * * *

UNITED STATES PATENT AND TRADEMARK OFFICE
CERTIFICATE OF CORRECTION

PATENT NO.      : 6,562,164 B1
DATED           : May 13, 2003
INVENTOR(S)     : Lynn Leroy Faulkner et al.

It is certified that error appears in the above-identified patent and that said Letters Patent is hereby corrected as shown below:

<u>Title page,</u>
Item [75[, Inventors, add -- John D. Clay, Gahanna, Ohio --

<u>Column 5,</u>
Line 2, "Degassinci" should be -- Degassing --

Signed and Sealed this

Seventh Day of October, 2003

JAMES E. ROGAN
*Director of the United States Patent and Trademark Office*